(12) United States Patent
Kook et al.

(10) Patent No.: US 10,871,205 B2
(45) Date of Patent: Dec. 22, 2020

(54) TRANSMISSION FOR VEHICLE

(71) Applicants: Hyundai Motor Company, Seoul (KR); Kia Motors Corporation, Seoul (KR)

(72) Inventors: Jae Chang Kook, Hwaseong-si (KR); Byeong Wook Jeon, Seoul (KR); Kwang Hee Park, Suwon-si (KR); Sang Jun Park, Seoul (KR); Seong Wook Hwang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/539,255

(22) Filed: Aug. 13, 2019

(65) Prior Publication Data

US 2020/0309236 A1 Oct. 1, 2020

(30) Foreign Application Priority Data

Mar. 25, 2019 (KR) .......................... 10-2019-0033387

(51) Int. Cl.
*F16H 3/56* (2006.01)

(52) U.S. Cl.
CPC ......... *F16H 3/56* (2013.01); *F16H 2200/006* (2013.01); *F16H 2200/0086* (2013.01); *F16H 2200/2007* (2013.01); *F16H 2200/2046* (2013.01)

(58) Field of Classification Search
CPC ................. F16H 3/56; F16H 2200/006; F16H 2200/0086; F16H 2200/2007; F16H 2200/2005; F16H 2200/2046
See application file for complete search history.

(56) References Cited

U.S. PATENT DOCUMENTS 5,520,587 A * 5/1996 Hall, III ................. F16H 3/66
475/218
5,520,588 A * 5/1996 Hall, III ................. F16H 3/66
475/218

(Continued)

FOREIGN PATENT DOCUMENTS

DE 10162888 A1 * 7/2003 ............. F16H 3/666
KR 10-2018-0138221 A 12/2018

*Primary Examiner* — Timothy Hannon
(74) *Attorney, Agent, or Firm* — Morgan, Lewis & Bockius LLP

(57) ABSTRACT

A transmission may include a compound planetary gear set; a first clutch provided to transmit power of an input shaft to a second rotation element of the compound planetary gear set; a third clutch provided to transmit the power of the input shaft to a third rotation element of the compound planetary gear set; an overdrive provided to increase the power of the input shaft; a second clutch provided to transmit the power through the overdrive from the input shaft to the second rotation element of the compound planetary gear set; a fourth clutch provided to transmit the power through the overdrive from the input shaft to a fourth rotation element of the compound planetary gear set; a first brake provided to selectively stop rotation of the third rotation element of the compound planetary gear set; and a second brake provided to selectively stop rotation of the fourth rotation element of the compound planetary gear set.

12 Claims, 3 Drawing Sheets

(56) References Cited

U.S. PATENT DOCUMENTS

| | | | | |
|---|---|---|---|---|
| 2004/0092357 A1* | 5/2004 | Biermann | ............ | F16H 37/042 |
| | | | | 475/296 |
| 2012/0100952 A1* | 4/2012 | Wittkopp | ................ | F16H 3/663 |
| | | | | 475/219 |
| 2012/0165154 A1* | 6/2012 | Wittkopp | ................ | F16H 3/663 |
| | | | | 475/296 |
| 2017/0182995 A1* | 6/2017 | Endo | ........................ | F16H 3/728 |

* cited by examiner

FIG. 2

| Gear stage | CL1 | CL2 | CL3 | CL4 | B1 | B2 |
|---|---|---|---|---|---|---|
| 1 | ● | | | | | ● |
| 2 | | ● | | | | ● |
| 3 | | | ● | | | ● |
| 4 | | ● | ● | | | |
| 5 | ● | | ● | | | |
| 6 | | | ● | ● | | |
| 7 | ● | | | ● | | |
| 8 | | ● | | ● | | |
| R1 | ● | | | | ● | |
| R2 | | ● | | | ● | |

TRANSMISSION FOR VEHICLE

CROSS REFERENCE TO RELATED APPLICATION

The present application claims priority to Korean Patent Application No. 10-2019-0033387, filed Mar. 25, 2019, the entire contents of which is incorporated herein for all purposes by this reference.

BACKGROUND OF THE INVENTION

Field of the Invention

The present invention relates to a transmission for a vehicle. More particularly, the present invention relates to a technology for a transmission structure capable of implementing a plurality of gear stages.

Description of Related Art

Since the output and the fuel consumption characteristics of the engine vary greatly depending on the operating region, the engine is operated in the optimum operation range if possible. To the present end, a transmission connecting the engine to the drive wheel is required to provide as many gear stages as possible.

In other words, the transmission is required to provide as many gear stages as possible to allow an engine to be continuously operated in the optimum operation range if possible despite variable driving conditions of a vehicle, improving fuel efficiency of the vehicle.

Of course, the transmission is configured to implement as many gear stages as possible while having a simple and compact configuration.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a transmission for a vehicle, in which it is, possible to improve fuel efficiency of a vehicle by implementing as many gear stages as possible with as few components as possible and in as a simple configuration as possible.

In various aspects of the present invention, there is provided a transmission for a vehicle, the transmission including: a compound planetary gear set including four rotation elements, wherein a first rotation element of the four rotation elements is used as an output element; a first coaxial gear fixedly connected to an input shaft, and mounted coaxially with the compound planetary gear set; a second coaxial gear mounted coaxially with the first coaxial gear; a counter shaft, which is a rotation shaft of a first connecting gear engaged with the first coaxial gear and a second connecting gear connected to the second coaxial gear, aligned parallel to the input shaft; a first clutch provided to selectively connect the first coaxial gear to a second rotation element of the compound planetary gear set; a second clutch provided to selectively connect the second coaxial gear to the second rotation element of the compound planetary gear set; a third clutch provided to selectively connect the first coaxial gear to a third rotation element of the compound planetary gear set; a fourth clutch provided to selectively connect the second coaxial gear to a fourth rotation element of the compound planetary gear set; a first brake provided to selectively stop rotation of the third rotation element of the compound planetary gear set; and a second brake provided to selectively stop rotation of the fourth rotation element of the compound planetary gear set.

The first coaxial gear and the second coaxial gear may be mounted at opposite sides of the compound planetary gear set, respectively.

The compound planetary gear set may include a first planetary gear set and a second planetary gear set, which are single pinion planetary gear sets each having three rotation elements.

The first planetary gear set may include a first sun gear, a first planet carrier, and a first ring gear; the second planetary gear set may include a second sun gear, a second planet carrier, and a second ring gear; the first planet carrier may be directly connected to the second ring gear to form the first rotation element; the first sun gear may be directly connected to the second sun gear to form the second rotation element; the second planet carrier may form the third rotation element; and the first ring gear may form the fourth rotation element.

The first coaxial gear may have a diameter greater than a diameter of the second coaxial gear.

A gear ratio formed by the first coaxial gear and the first connecting gear multiplied by a gear ratio formed by the second connecting gear and the second coaxial gear may be less than 1.

In various aspects of the present invention, there is further provided a transmission for a vehicle, the transmission including: a compound planetary gear set including four rotation elements, with a first rotation element of the four rotation elements configured as an output element; a first clutch provided to selectively connect an input shaft to a second rotation element of the compound planetary gear set; a third clutch provided to selectively connect the input shaft to the third rotation element of the compound planetary gear set; an overdrive provided to increase the power of the input shaft; a second clutch provided to selectively transmit the power through the overdrive from the input shaft to the second rotation element of the compound planetary gear set; a fourth clutch provided to selectively transmit the power through the overdrive from the input shaft to a fourth rotation element of the compound planetary gear set; a first brake provided to selectively connect the third rotation element of the compound planetary gear set to a transmission housing; and a second brake provided to selectively connect the fourth rotation element of the compound planetary gear set to the transmission housing.

The overdrive may include: a first coaxial gear fixed to the input shaft and a second coaxial gear mounted coaxially with the compound planetary gear set; a first connecting gear engaged with the first coaxial gear; a second connecting gear engaged with the second coaxial gear; and a counter shaft forming a rotation shaft of both the first connecting gear and the second connecting gear, and being mounted parallel to rotation axes of the first coaxial gear and the second coaxial gear.

The first coaxial gear and the second coaxial gear may be mounted at opposite sides of the compound planetary gear set, respectively.

The compound planetary gear set may have two single pinion planetary gear sets configured such that a sun gear is used in common, and a carrier of one planetary gear set and a ring gear of a remaining planetary gear set are directly connected to each other.

The present invention is advantageous in that it is possible to improve fuel efficiency of a vehicle by implementing as many gear stages as possible with as few components as possible and in as a simple configuration as possible.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operation mode table of the transmission of FIG. 1.

Figure 1:
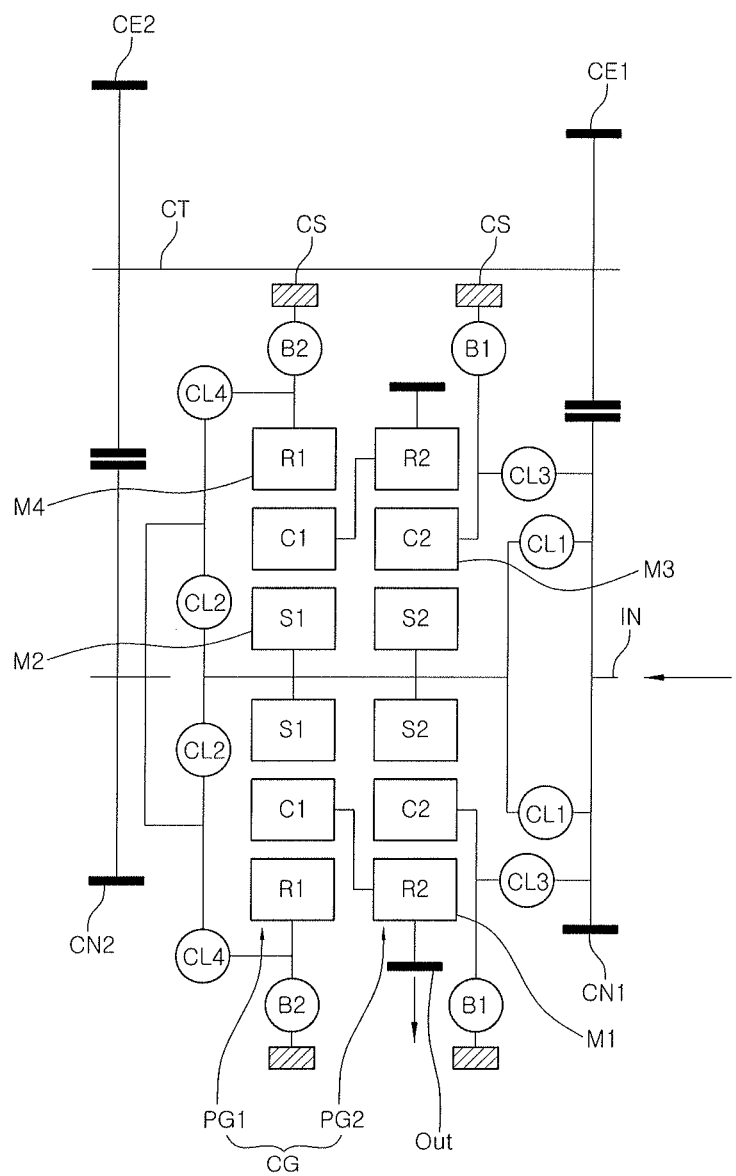
FIG. 1 is a view showing a configuration of a transmission for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinbelow, a transmission for a vehicle according to an exemplary embodiment of the present invention will be described in detail with reference to the accompanying drawings.

With reference to FIG. 1, an exemplary embodiment of a transmission for a vehicle according to an exemplary embodiment of the present invention may include a compound planetary gear set CG provided with four rotation elements, and configured such that a first rotation element M1 of the four rotation elements functions as an output element OUT; a first clutch CL1 provided to selectively transmit power of an input shaft IN to a second rotation element M2 of the compound planetary gear set CG; a third clutch CL3 provided to selectively transmit the power of the input shaft IN to a third rotation element M3 of the compound planetary gear set CG; an overdrive provided to increase the power of the input shaft IN; a second clutch CL2 provided to selectively transmit the power through the overdrive from the input shaft IN to the second rotation element M2 of the compound planetary gear set CG; a fourth clutch CL4 provided to selectively transmit the power through the overdrive from the input shaft IN to a fourth rotation element M4 of the compound planetary gear set CG; a first brake B1 provided to fix the third rotation element M3 of the compound planetary gear set CG to a transmission housing CS; and a second brake B2 provided to fix the fourth rotation element M4 of the compound planetary gear set CG to the transmission housing CS.

In the exemplary embodiment of the present invention, the overdrive includes: a first coaxial gear CN1 and a second coaxial gear CN2 mounted coaxially with the compound planetary gear set CG; a first connecting gear CE1 engaged with the first coaxial gear CN 1; a second connecting gear CE2 engaged with the second coaxial gear CN2; and a counter shaft CT forming a rotation shaft of both the first connecting gear CE1 and the second connecting gear CE2, and being mounted parallel to rotation shafts of the first coaxial gear CN1 and the second coaxial gear CN2.

In other words, the present invention is configured to selectively transmit the power from the input shaft IN to the second rotation element M2, the third rotation element M3, and the fourth rotation element M4 of the four rotation elements of the compound planetary gear set CG, except the first rotation element M1 used as the output element OUT, wherein the power of the input shaft IN is transmitted to the second rotation element M2 and the third rotation element M3 without shifting, and also, is increased through the overdrive and transmitted to the second rotation element M2 and the fourth rotation element M4.

The first coaxial gear CN1 and the second coaxial gear CN2 are mounted at opposite sides of the compound planetary gear set CG, respectively, and the first coaxial gear CN1 has a diameter greater than a diameter of the second coaxial gear CN2.

Accordingly, a gear ratio formed by the first coaxial gear CN1 and the first connecting gear CE1 multiplied by a gear ratio formed by the second connecting gear CE2 and the second coaxial gear CN2 is less than 1, so that the power supplied from the input shaft IN to the first coaxial gear CN1 is increased to a predetermined gear ratio through the first connecting gear CE1, the second connecting gear CE2, and the second coaxial gear CN2.

The compound planetary gear set CG includes two single pinion planetary gear sets configured such that a sun gear is used in common, and a carrier of one planetary gear set and a ring gear of a remaining planetary gear set are directly connected to each other.

In other words, the compound planetary gear set CG includes a first planetary gear set PG1 and a second planetary gear set PG2, which are single pinion planetary gear sets each having three rotation elements.

The first planetary gear set PG1 includes a first sun gear S1, a first planet carrier C1, and a first ring gear R1; the second planetary gear set PG2 includes a second sun gear S2, a second planet carrier C2, and a second ring gear R2; the first planet carrier C1 is directly connected to the second ring gear R2 to form the first rotation element M1; the first sun gear S1 is directly connected to the second sun gear S2 to form the second rotation element M2; the second planet carrier C2 forms the third rotation element M3; and the first ring gear R1 forms the fourth rotation element M4.

Figure 3:
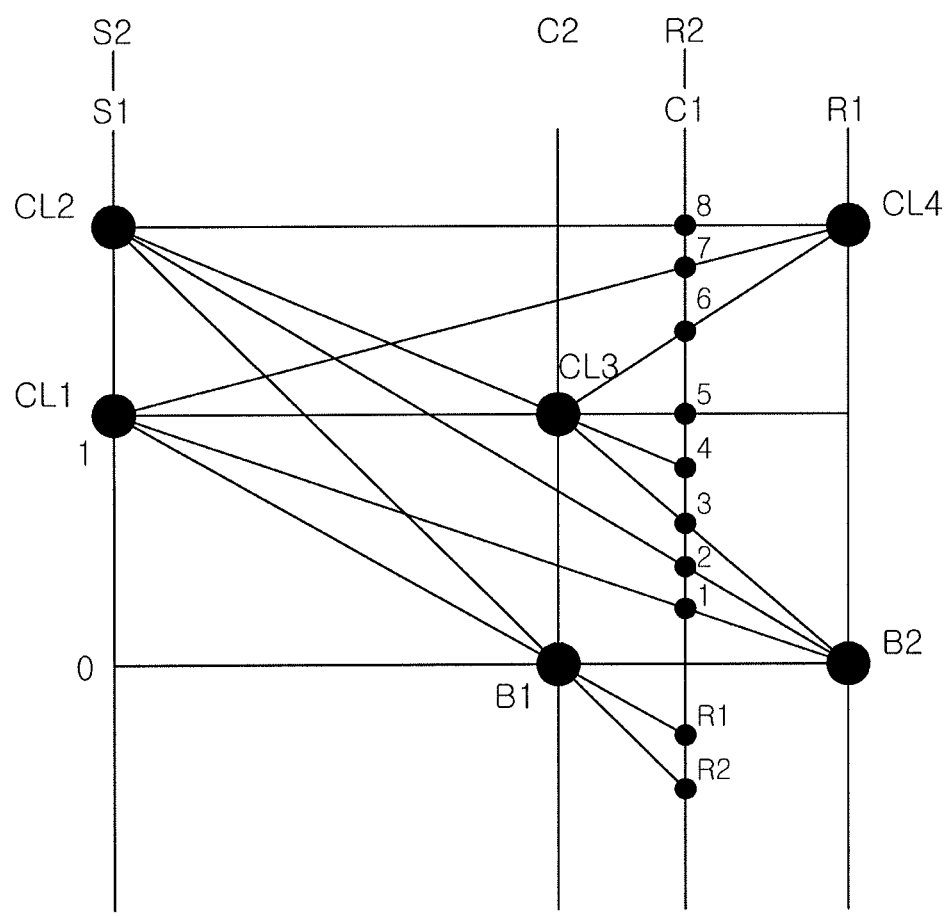
FIG. 3 is a lever diagram showing a state where the transmission implements each gear stage.

The transmission for a vehicle of the present invention configured as described above is operated according to an operation mode table such as the table of FIG. 2 and implements multiple gear stages as shown in FIG. 3.

In other words, by changing the engagement combination between the first clutch CL1 to the fourth clutch CL4, the first brake B1, and the second brake B2 as shown in FIG. 2, it is possible to implement eight forward gear stages and two reverse speeds.

For example, in the state where the second brake B2 and the first clutch CL1 are engaged, the power transmitted to the input shaft IN is supplied to the first sun gear S1 and the second sun gear S2, and is shifted and is output through the first planet carrier C1 and the second ring gear R2, which are the output element OUT, forming the first forward gear as shown in FIG. 3.

In the case of the fifth forward gear, the first clutch CL1 and the third clutch CL3 are engaged such that all the rotation elements of the compound planetary gear set CG are integrally rotated, realizing a gear ratio of 1:1.

The sixth to eighth forward gears obtain the increased output by engaging the second clutch CL2 and the fourth clutch CL4, wherein the sixth forward gear is implemented by engaging the third clutch CL3 and the fourth clutch CL4, the seventh forward gear is implemented by engaging the first clutch CL1 and the third clutch CL3, and the eighth forward gear is implemented by engaging the second clutch CL2 and the fourth clutch CL4.

Meanwhile, when the first clutch CL1 is engaged in the state where the first brake B1 is engaged, R1 gear which is the first reverse gear is formed, and when the second clutch CL2 is engaged in the state where the first brake B1 is engaged, R2 which is the second reverse gear is formed.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof It is intended that the scope of the present invention be defined by the Claims appended hereto and their equivalents.

What is claimed is:

1. A transmission for a vehicle, the transmission comprising:
    a compound planetary gear set including four rotation elements having a first rotation element, a second rotation element, a third rotation element, and a fourth rotation element, wherein the first rotation element of the four rotation elements is used as an output element;
    a first coaxial gear fixedly connected to an input shaft, and mounted coaxially with the compound planetary gear set;
    a second coaxial gear mounted coaxially with the first coaxial gear;
    a counter shaft, wherein a first connecting gear engaged with the first coaxial gear and a second connecting gear engaged with the second coaxial gear are fixedly connected to the counter shaft and wherein the counter shaft is aligned parallel to the input shaft;
    a first clutch provided to selectively connect the first coaxial gear to the second rotation element of the compound planetary gear set;
    a second clutch provided to selectively connect the second coaxial gear to the second rotation element of the compound planetary gear set;
    a third clutch provided to selectively connect the first coaxial gear to the third rotation element of the compound planetary gear set;
    a fourth clutch provided to selectively connect the second coaxial gear to the fourth rotation element of the compound planetary gear set;
    a first brake provided to selectively stop rotation of the third rotation element of the compound planetary gear set; and
    a second brake provided to selectively stop rotation of the fourth rotation element of the compound planetary gear set,
    wherein the compound planetary gear set includes a first planetary gear set including first three rotation elements and a second planetary gear set including second three rotation elements, to form six rotation elements including the four rotation elements, wherein the first planetary gear set and the second planetary gear set are single pinion planetary gear sets,
    wherein the first planetary gear set having the first three rotation elements includes a first sun gear, a first planet carrier, and a first ring gear,
    wherein the second planetary gear set having the second three rotation elements includes a second sun gear, a second planet carrier, and a second ring gear,
    wherein the first planet carrier is fixedly connected to the second ring gear to form the first rotation element,
    wherein the first sun gear is fixedly connected to the second sun gear to form the second rotation element,
    wherein the second planet carrier is the third rotation element, and
    wherein the first ring gear is the fourth rotation element.

2. The transmission of claim 1, wherein the first coaxial gear and the second coaxial gear are mounted at a first opposite side and a second opposite side of the compound planetary gear set, respectively.

3. The transmission of claim 1, wherein the first coaxial gear has a diameter greater than a diameter of the second coaxial gear.

4. The transmission of claim 1, wherein a gear ratio formed by the first coaxial gear and the first connecting gear multiplied by a gear ratio formed by the second connecting gear and the second coaxial gear is less than 1.

5. A transmission for a vehicle, the transmission including:
- a compound planetary gear set including four rotation elements having first, second, third, and fourth rotation elements, wherein the first rotation element of the four rotation elements is an output element;
- a first clutch provided to selectively connect an input shaft to the second rotation element of the compound planetary gear set;
- a third clutch provided to selectively connect the input shaft to the third rotation element of the compound planetary gear set;
- an overdrive gearset engaged to the input shaft and provided to increase a power of the input shaft;
- a second clutch provided to selectively transmit the power through the overdrive gearset from the input shaft to the second rotation element of the compound planetary gear set;
- a fourth clutch provided to selectively transmit the power through the overdrive gearset from the input shaft to the fourth rotation element of the compound planetary gear set;
- a first brake provided to selectively connect the third rotation element of the compound planetary gear set to a transmission housing; and
- a second brake provided to selectively connect the fourth rotation element of the compound planetary gear set to the transmission housing,
- wherein the compound planetary gear set includes two single pinion planetary gear sets, and
- wherein a sun gear is used in common in the two single pinion planetary gear sets to form the second rotation element of the compound planetary gear set, and a carrier of one planetary gear set among the two single pinion planetary gear sets and a ring gear of a remaining planetary gear set among the two single pinion planetary gear sets are fixedly connected to each other to form the first rotation element of the compound planetary gear set.

6. The transmission of claim 5, wherein the overdrive gearset includes:
- a first coaxial gear fixed to the input shaft and a second coaxial gear mounted coaxially with the compound planetary gear set;
- a first connecting gear engaged with the first coaxial gear;
- a second connecting gear engaged with the second coaxial gear; and
- a counter shaft, wherein the first connecting gear and the second connecting gear are fixedly connected to the counter shaft, and wherein the counter shaft is aligned parallel to rotation axes of the first coaxial gear and the second coaxial gear.

7. The transmission of claim 6, wherein the first coaxial gear and the second coaxial gear are mounted at a first opposite side and a second opposite side of the compound planetary gear set, respectively.

8. The transmission of claim 6, wherein the first coaxial gear has a diameter greater than a diameter of the second coaxial gear.

9. The transmission of claim 8, wherein a gear ratio formed by the first coaxial gear and the first connecting gear multiplied by a gear ratio formed by the second connecting gear and the second coaxial gear is less than 1.

10. The transmission of claim 5,
- wherein a ring gear of the one planetary gear set among the two single pinion planetary gear sets is the fourth rotation element of the compound planetary gear set, and
- wherein a carrier of the remaining planetary gear set among the two single pinion planetary gear sets is the third rotation element of the compound planetary gear set.

11. The transmission of claim 5, wherein the two single pinion planetary gear sets of the compound planetary gear set include a first planetary gear set including first three rotation elements and a second planetary gear set including second three rotation elements, to form six rotation elements including the four rotation elements, wherein the first planetary gear set and the second planetary gear set are single pinion planetary gear sets.

12. The transmission of claim 11,
- wherein the first planetary gear set having the first three rotation elements includes a first sun gear, a first planet carrier, and a first ring gear,
- wherein the second planetary gear set having the second three rotation elements includes a second sun gear, a second planet carrier, and a second ring gear,
- wherein the first planet carrier is fixedly connected to the second ring gear to form the first rotation element,
- wherein the first sun gear is fixedly connected to the second sun gear to form the second rotation element,
- wherein the second planet carrier is the third rotation element, and
- wherein the first ring gear is the fourth rotation element.

* * * * *